(12) United States Patent  (10) Patent No.: US 7,805,933 B2
Hanitzsch et al.  (45) Date of Patent: Oct. 5, 2010

(54) THROTTLE ARRANGEMENT AND EXHAUST SYSTEM EQUIPPED WITH SAME

(75) Inventors: Robert Hanitzsch, Kernen (DE); Bjoern Damson, Stuttgart (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 897 days.

(21) Appl. No.: 11/708,924

(22) Filed: Feb. 21, 2007

(65) Prior Publication Data

US 2007/0193260 A1    Aug. 23, 2007

(30) Foreign Application Priority Data

Feb. 21, 2006   (DE)   .................   10 2006 008 346

(51) Int. Cl.
 *F01N 1/00*   (2006.01)
 *F16K 15/00*  (2006.01)
 *F16K 17/00*  (2006.01)
 *F16K 21/04*  (2006.01)
 *F16K 1/16*   (2006.01)

(52) U.S. Cl. ..................... 60/324; 137/527; 251/303

(58) Field of Classification Search ............... 60/285, 60/324; 123/90.15–90.18, 90.65; 137/527; 251/303
See application file for complete search history.

(56) References Cited

U.S. PATENT DOCUMENTS 1,330,265 A * 2/1920 Hinton ................. 137/527

6,176,347 B1 * 1/2001 Chae et al. ............... 181/254

FOREIGN PATENT DOCUMENTS

| EP | 0622538 A1 | 11/1994 |
|---|---|---|
| EP | 0657317 A1 | 6/1995 |
| FR | 2588806 A1 | 4/1987 |
| WO | WO 99/63184 | 12/1999 |

OTHER PUBLICATIONS

European Search Report dated May 24, 2007 for related EP Application No. EP 07 10 2347.

* cited by examiner

*Primary Examiner*—Thomas E Denion
*Assistant Examiner*—Audrey Klasterka
(74) *Attorney, Agent, or Firm*—Howard IP Law Group, PC

(57) ABSTRACT

The invention relates to a throttle arrangement for an exhaust system of an internal combustion engine having a throttle valve for throttling a stream of exhaust gas flowing through a pipe and having a restoring spring which prestresses the throttle valve into a closed position. The throttle valve is pivotable about a pivot axis in the pipe between the closed position [and the open position] and the restoring spring is supported on the valve end on a lever fixedly connected to the throttle valve and is supported at the pipe end on a bearing for accommodating a shaft extending coaxially with the pivot axis. The restoring spring is adapted to support the spring forces on the pipe end in an essentially symmetrical manner with respect to a plane of symmetry that extends perpendicular to the pivot axis and is in the area of the support on the valve end.

20 Claims, 3 Drawing Sheets

THROTTLE ARRANGEMENT AND EXHAUST SYSTEM EQUIPPED WITH SAME

FIELD OF THE INVENTION

The present invention relates to a throttle arrangement for an exhaust system of an internal combustion engine and to an exhaust system equipped with such a throttle arrangement as well.

BACKGROUND OF THE INVENTION

DE 103 04 364 A1 describes a throttle arrangement and an exhaust system of the type defined above. The known throttle arrangement includes a throttle valve for throttling an exhaust gas stream flowing through a pipe and a restoring spring applying prestress to the throttle valve pulling it into the closed position. The throttle valve is pivotable about a pivot axis in the pipe between the closed position, in which it at least partially closes a predetermined cross-sectional area of the pipe, and an open position, in which it releases the cross-sectional area due to the pressure of the exhaust gas against the spring force of the restoring spring. With the known throttle arrangement, the restoring spring is designed as a leg-spring whose helical spring section is arranged coaxially with a shaft that in turn extends coaxially with the pivot axis of the throttle valve. The shaft is arranged in a lateral recess in the pipe that is open toward the exhaust gas flow. The leg spring is supported with a free leg on a lever fixedly connected to the throttle valve and is supported with the other free leg on a wall of the aforementioned recess. The restoring spring is thus supported on the lever on the valve end and on the pipe on the pipe end and/or on a bearing to accommodate the shaft.

It has been found that in operation of the throttle arrangement in adjustment of the throttle valve, friction occurs between the restoring spring and neighboring components on the one hand and between the throttle valve and the pipe on the other hand. First, the helical spring section of the restoring spring may grind against the shaft in particular. Owing to the frequent adjusting movements of the throttle valve that occur during operation of the internal combustion engine, there may be abrasion and therefore weakening of the material of the restoring spring. Weakening of the material in an area of the restoring spring that is important for the spring elasticity can alter its spring characteristic, which has a negative effect on the function of the throttle arrangement. For example, one or more windings of the helical spring section may be weakened due to friction on the shaft, so the leg spring then has a softer spring characteristic. In the extreme case, continued friction can destroy the restoring spring. For example, the leg spring may break in its helical spring section. The restoring spring is then virtually ineffective and the throttle arrangement then fails. In addition, the throttle valve may also grind on the pipe, making it difficult to operate, and with progressive soiling, it may even jam and ultimately seize up. This can also lessen the efficacy of the throttle arrangement, leading to total failure.

SUMMARY OF THE INVENTION

The present invention relates to the problem of providing an improved embodiment for a throttle arrangement and/or an exhaust system equipped with same such that the improved embodiment is characterized by a longer lifetime of the throttle arrangement in particular.

The invention is based on the general idea of supporting the restoring spring symmetrically on the pipe end. As a result, the restoring spring is stressed symmetrically on the pipe end, which makes it possible in particular to prevent or at least reduce any tilting moments about a tilt axis running across the pivot axis; likewise, axial displacement in the direction of the pivot axis can be prevented. On the one hand, this prevents or reduces contact and thus friction between the restoring spring and its support on the pipe end, while on the other hand preventing and/or reducing contact between the throttle valve and the pipe. In the case of a simple leg spring, which has an asymmetrical support, such a tilting moment results in the longitudinal axis of its helical spring section rotating spatially about the tilt axis, such that the helical section of the leg spring comes to rest against the shaft running coaxially through the helical spring section and rubs against the shaft. Furthermore, this tilting moment produces an axial displacement of the throttle valve and tilting of the throttle valve in relation to the pipe. Due to the support designed with mirror symmetry with regard to a plane of symmetry extending in the area of the support of the restoring spring on the valve end, such relative adjustments can be reduced or prevented. It is possible in this way to decrease the abrasive friction effects, which increases the lifetime of the throttle arrangement.

In an exemplary embodiment, the restoring spring may be formed by a double-leg spring having two helical spring sections connected by a strap section. The double-leg spring is supported on the valve end via the strap section, while it is supported on the pipe end via two free legs. The two helical spring sections are relatively short with regard to the longitudinal direction of the helix, so this reduces the risk of comparatively large relative movements.

In another exemplary embodiment of the restoring spring designed as a double-leg spring, it is possible to provide in particular for the helical spring sections to be arranged so that they are free-standing between the strap and the free legs, thereby making it possible to prevent contact between the helical spring sections and other components, e.g., the bearing. This free-standing arrangement is made possible due to the symmetrical force support.

In yet another alternative embodiment, the restoring spring may be designed as a plate spring which is supported via a free end section on the valve end and in particular via a designated holding section on the pipe end. A plate spring can be designed especially easily so that movable areas (apart from the end section) are free of contact with other components and therefore are free of friction.

It is self-evident that the features mentioned above and those to be explained below may be used not only in the particular combination given but also in other combinations or alone without going beyond the scope of the present invention.

BRIEF DESCRIPTION OF THE DRAWINGS

Exemplary embodiments of the invention are depicted in the drawings and are explained in greater detail in the following description, whereby the same reference numerals are used to refer to the same or similar or functionally identical components.

The drawings show, each in schematic diagrams.

DETAILED DESCRIPTION OF THE INVENTION

Figure 1:
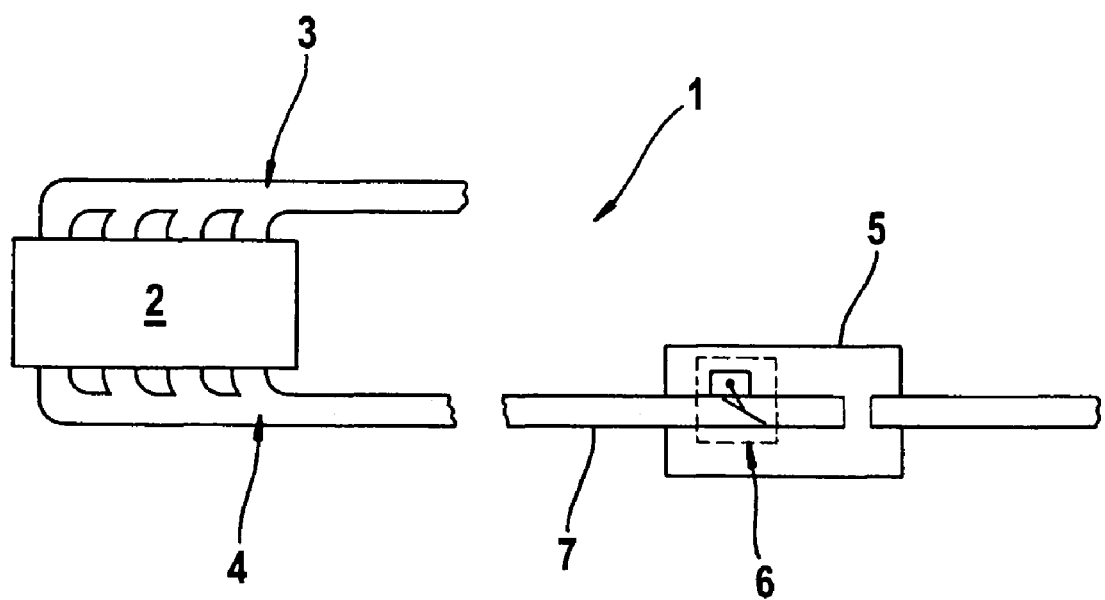
FIG. 1 is a simplified basic diagram of an internal combustion engine with an exhaust system.

According to FIG. 1, an internal combustion 1 includes an engine block 2 which is connected to a fresh gas system 3 for supplying fresh gas, in particular fresh air, and an exhaust gas system 4 for removing the exhaust gas. The exhaust system 4 includes in the usual manner (not shown here) exhaust gas purification equipment, e.g., a particulate filter and/or at least one catalytic converter and muffler equipment. A rear muffler 5 is shown here only as an example. The exhaust system 4 has at least one throttle arrangement 6 with the help of which the exhaust stream can be controlled as a function of the exhaust pressure in a pipe 7 of the exhaust system 4. The pipe 7 is formed by an exhaust line of the exhaust system 4. In the example shown here, the throttle arrangement 6 is arranged in the rear muffler 5. Another position of the throttle arrangement 6 within the exhaust system 4 is also possible.

According to FIGS. 2 through 5, the throttle arrangement 6 includes a throttle valve 8 and a restoring spring 9. The throttle valve 8 is situated in the pipe 7, only a small section of which is shown here; the throttle valve has a rectangular cross section and serves to throttle a stream of exhaust gas coming through the pipe 7. The restoring spring 9 here acts directly or indirectly together with the throttle valve 8, prestressing it into a closed position as shown here.

The throttle valve 8 can be pivoted about a pivot axis 10 between said closed position and an open position in the pipe 7. In the closed position, the throttle valve 8 at least partially closes a predetermined cross-sectional area, preferably the entire cross section of the pipe 7 through which the flow can pass. In its closed position, the throttle valve 8 preferably closes the cross-sectional area and/or the pipe 7 as completely as possible. In its open position, the throttle valve 8 releases the cross-sectional area to a greater or lesser extent. The throttle valve 8 is driven into the open position by the exhaust pressure against the spring force of the restoring spring 9 prevailing upstream from the throttle valve 8. The throttle arrangement 6 acts mainly as a muffler in the exhaust system 4.

In the exemplary embodiments shown here, the throttle valve 8 is attached to a lever 11 which is mounted to pivot about the pivot axis 10. This pivot axis 10 extends across the main direction of flow of the exhaust gases. In the embodiments shown here, the pivot axis 10 extends outside of the pipe 7. A shaft 12 which is provided to implement the pivot axis 10 is accommodated in a bearing 13 and extends coaxially with the pivot axis 10. For example, the shaft 12 is mounted on the bearing 13 so it can rotate about the pivot axis 10 while it is connected to the lever 11 in a rotationally fixed manner. The rotationally fixed connection between the shaft 12 and the lever 11 is accomplished here by means of an outer polygonal structure of the shaft 12. Likewise, another form-fitting connection or a welded connection or the like is also possible.

On its lateral longitudinal edges, the throttle valve 8 has side walls, which are not identified further here but protrude essentially at a right angle on a side of the throttle valve 8 facing away from the lever 11 and then run parallel to the side walls of the pipe 7. This results in guidance and stabilization of the throttle valve 8 inside the pipe 7.

The lever 11 is connected by two walls (not identified further here) to the throttle valve 8. To do so, the lever 11 with the walls extends through slot-shaped side openings 14 in the pipe 7. These walls have a curved contour 15 with respect to the pivot axis 10, so that the side openings 14 can be designed to be comparatively small.

The bearing 13 here is formed by a saddle-shaped component which is a separate component with regard to the pipe 7 and on which the pipe 7 is placed. The bearing 13 may be attached to the pipe 7 in a suitable manner, e.g., by soldering, welding, gluing or upsetting. To accommodate the shaft 12, the bearing 13 has a U-shaped recess 17 on two side parts 16 protruding in parallel beyond the pipe 7. The shaft 12 is inserted into these recesses 17 at its axial end sections. The two side parts 16 are interconnected by a bridge part 18 running parallel to the pivot axis 10, bridging the pipe 7 on the side of the shaft 12.

The restoring spring 9 is supported on the throttle valve 8 on the valve end or on the lever 11, as shown here. A corresponding support is labeled as 19 here. On the pipe end, the restoring spring 9 is supported on the pipe 7 or on the bearing 13, as shown here. A corresponding support is labeled here as 20.

In the illustrated embodiments, the restoring spring 9 is adapted to support the spring forces on the pipe end essentially symmetrically with regard to a plane of symmetry 32. On one end, the plane of symmetry 32 extends perpendicular to the pivot axis 10 and at the other end the plane of symmetry 32 extends in the area of the support 19 near the valve. Due to the symmetrical support of the spring forces on the pipe end, tilting moments about a tilt axis running across the pivot axis 10 within the restoring spring 9 can be prevented or reduced, so that the restoring spring 9 remains in a relatively stable position even when the throttle valve 8 is pivoted open and closed. In addition, this also stabilizes the relative position of the throttle valve 8. Axial displacement of the shaft 12 and thus of the lever 11 and the throttle valve 8 in particular can be avoided. Wear due to friction can be reduced in this way.

In the illustrated embodiments, the restoring spring 9 is manufactured from one piece. In addition, each throttle arrangement 6 has only one single restoring spring 9. The restoring spring 9 is also designed with mirror symmetry with regard to the plane of symmetry 32 at least in a spring section that generates the spring force.

Figure 2:
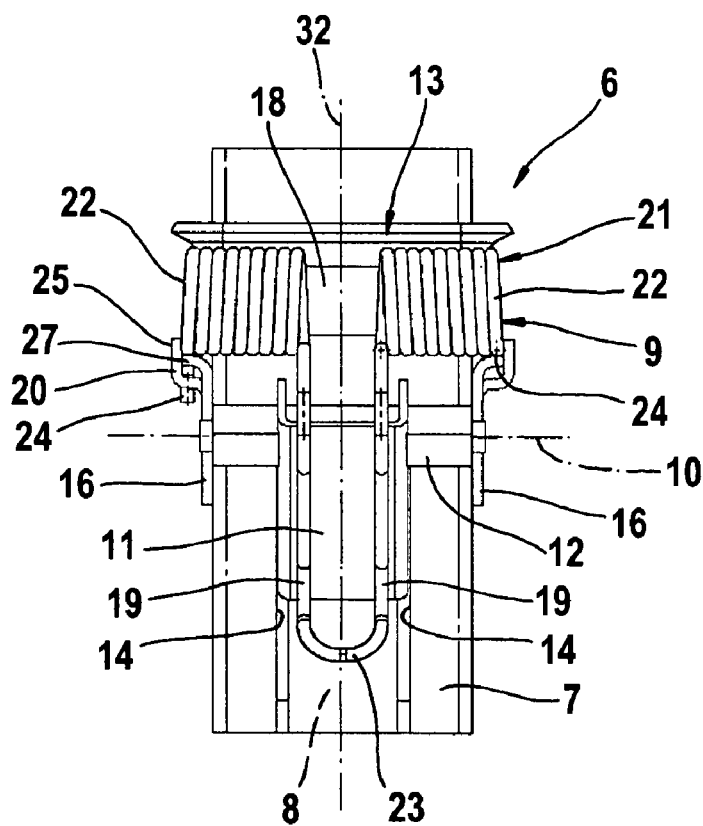
FIG. 2 is a top view of a throttle arrangement.

In the embodiment shown in FIG. 2, the restoring spring 9 is supported via two contact points which are spaced a distance apart in the longitudinal direction of the pivot axis 10 and are equidistant with regard to the pivot axis 10, these supporting points thus forming the support 19 on the valve end. In the embodiment illustrated in FIGS. 4 and 5, the restoring spring 9 is supported on the lever 11, for example, via a line of contact running parallel to the pivot axis 10 and forming the support 19 on the valve end here. Likewise, an embodiment in which the restoring spring 9 is supported only via a single central contact point on the valve end is also possible. The contact points and/or the line of contact 19 may migrate radially along the lever 11 in pivoting adjustment of the throttle valve 8. To reduce wear here, the lever 11 and/or the restoring spring 9 may be smooth in the corresponding area and may be provided with a suitable antifriction coating in particular. The line of contact and/or the contact point 19 is/are expediently also arranged in mirror symmetry with the plane of symmetry 32.

Figure 4:
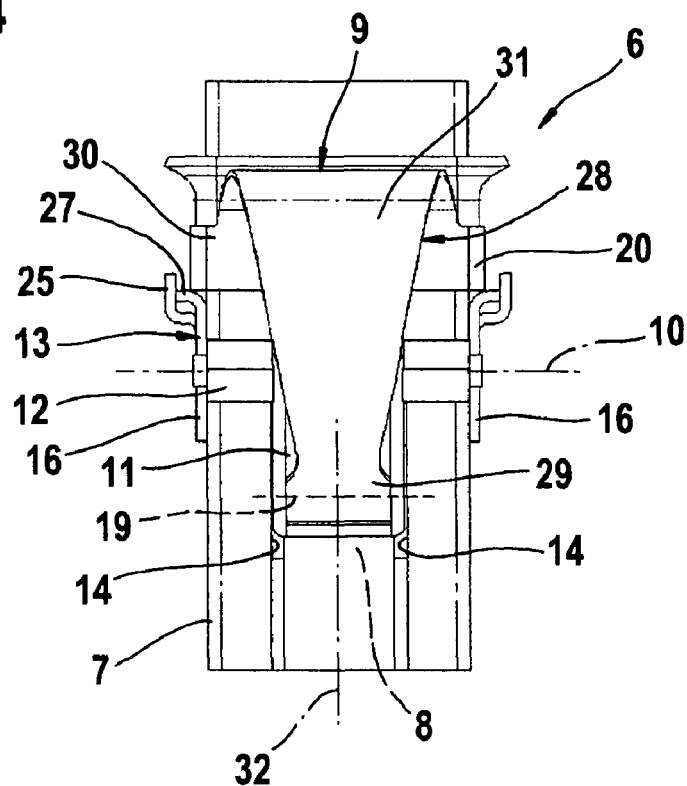
FIG. 4 is a top view of another throttle arrangement.
Figure 5:
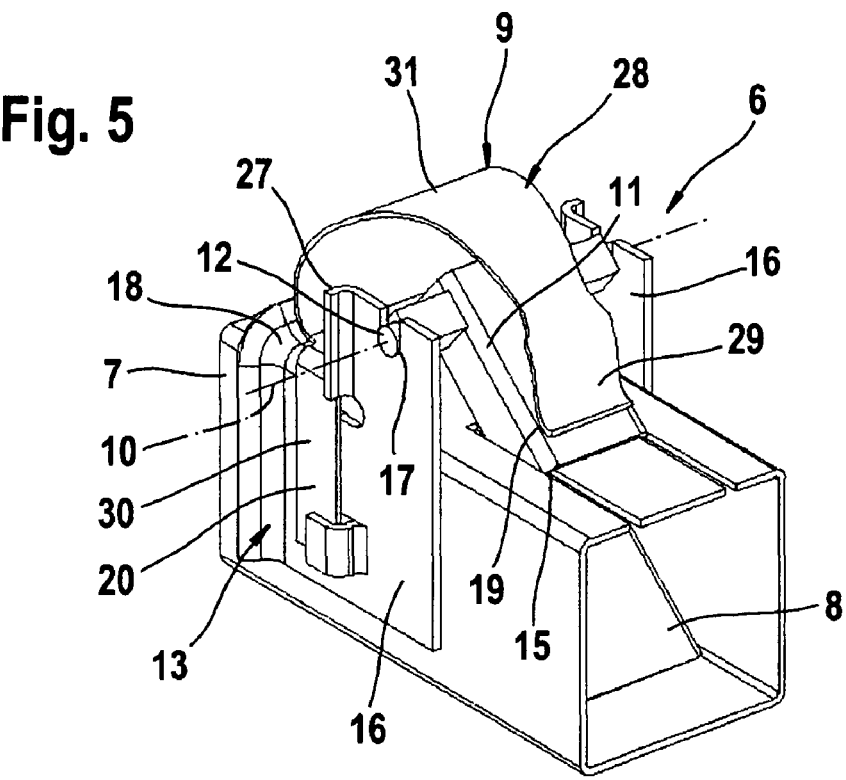
FIG. 5 is a perspective view of the throttle arrangement of FIG. 4.

In another embodiment, the shaft 12 may be secured in the recesses 17 on the bearing 13 by the restoring spring 9, which is implemented here in particular in the embodiment illustrated in FIGS. 4 and 5. In addition, the restoring spring 9 is preferably mounted on the bearing 13 in a self-holding manner. For example the restoring spring 9 may be attached onto the bearing 13 or clipped to it or locked to it. Then no additional fastening means are necessary.

Figure 3:
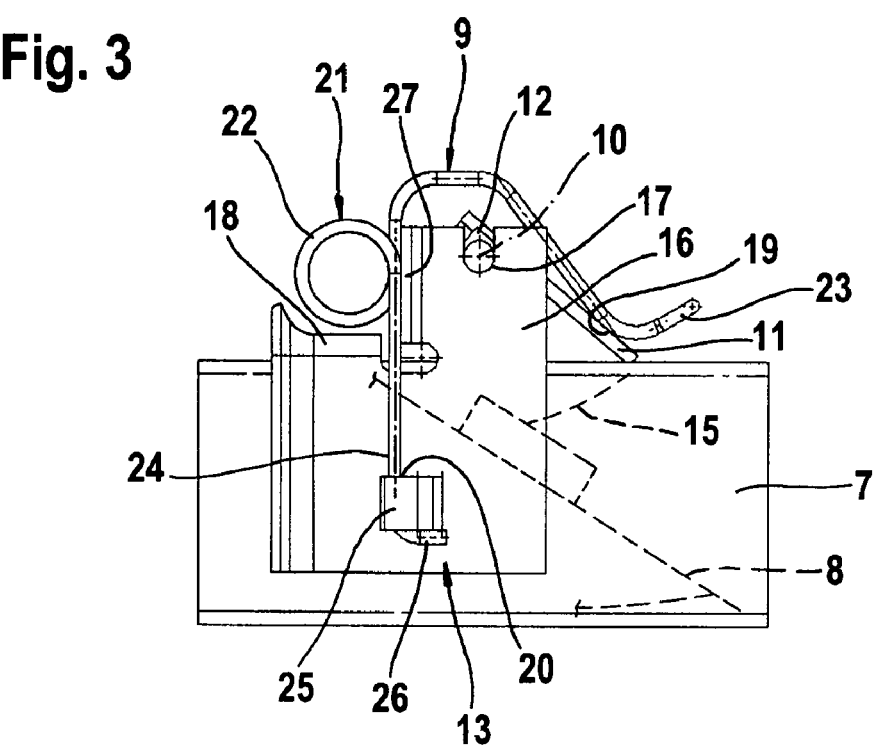
FIG. 3 is a side view of the throttle arrangement of FIG. 2.

In the embodiment shown in FIGS. 2 and 3, the restoring spring 9 is designed as a double-leg spring 21 which is characterized by two helical spring sections 22, a shared strap 23 and two free legs 24. The strap 23 connects the two helical spring sections 22 to one another and is supported on the throttle valve 8 and/or on the lever 11. The strap 23 is shaped here so as to yield the desired point contact with the lever 11. The double-leg spring 21 is held on the bearing 13. To do so, the double-leg spring 21 is supported with one of its free legs 24 or preferably with both free legs 24, each leg on an abutment 25 of the bearing 13 with a prestress. The abutment 25 is formed, for example, by a freely cut strap which is cut out and raised on the bearing 13. The free leg 24 facing the observer in FIG. 3 has an angled end section 26 on its free end extending over the abutment 25 on the side so that the double-leg spring 9 is secured against unintentional pulling on the bearing 13.

An embodiment in which at least one of the free legs 24 secures the shaft 12 radially on the bearing 13 is also conceivable. For example, the respective leg 24 may extend over the shaft 12 on the open side of the recess 17 for this purpose, to which end it may be passed beneath the bridge part 18, for example. Likewise, an embodiment in which the one leg 24 cooperates with the abutment 25 while the other leg 24 secures the shaft 12 radially is also conceivable. Likewise, both legs 24 may be supported on such an abutment 25 as well as ensuring the desired radial securing of the shaft 12.

For the leg 24 facing the observer in FIG. 3, a support contour 27 may also be formed on the side part 16 of the bearing 13, e.g., by an angled section of the side part 16. This makes it possible to improve the position of the double-leg spring 21 in relation to the bearing 13.

In another exemplary embodiment shown here, the helical spring sections 22 of the double-leg spring 21 are arranged outside of the shaft 12. The longitudinal middle axes of the helical spring sections 22 run in parallel with but eccentrically to the pivot axis 10. The helical spring sections 22 are arranged such that they are free-standing between the strap 23 and its free legs 24. The helical spring sections 22 are thus without contact with other components or parts of the throttle arrangement 6.

The spring section which is mentioned above and which generates the spring force in the restoring spring 9 is formed by the strap 23 and the helical spring section 22 in the case of the double-leg spring 21. In this spring section, the double-leg spring 21 is designed symmetrically with respect to the plane of symmetry 32.

In the embodiment shown in FIGS. 4 and 5, the restoring spring 9 is designed as a plate spring. The plate spring 28 has an end section 29 and a holding section 30 as well as middle section 31 running between the end section 29 and the holding section 30. The middle section 31 together with the end section 39 forms the spring section which generates the spring force and is preferably designed to be symmetrical with the plane of symmetry 32. The plate spring 28 is supported at the end section 29 on the throttle valve 8 and/or on the lever 11.

With its holding section 30, the plate spring 28 is held on the bearing 13, outside of the pipe 7. The holding section 30 here is designed as a U-shaped section which extends around the bearing 13 in the area of the bridge part 18. The holding section 30 may be clipped or welded or soldered to the bearing 13. The holding section 30 in particular cooperates here with a supporting contour 27, again in the axial direction, and may engage in a strap 25 and/or be supported on an abutment 25.

A securing section may be formed on the holding section 30, extending parallel to the pipe 7, for example. This securing section may be adapted to secure the shaft 12 radially on the bearing 13. For example, the securing section extends around the shaft 12 in the area of the open end of the recess 17. In addition, the securing section may also be designed for implementation of a means for securing the shaft 12 axially. In the case of two securing sections arranged symmetrically, axial centering of the shaft 12 is also feasible.

The invention claimed is:

1. A throttle arrangement for an exhaust system of an internal combustion engine, said throttle arrangement comprising:
    a throttle valve for throttling a stream of exhaust gas flowing through a pipe; and
    a restoring spring which prestresses said throttle valve into a closed position;
    wherein said throttle valve in the pipe can be pivoted about a pivot axis between the closed position, in which it at least partially closes a predetermined cross-sectional area of the pipe, and an open position, in which it releases the cross-sectional area due to the pressure of the exhaust gas against the spring force of said restoring spring,
    wherein said restoring spring is supported on said throttle valve on the valve end or on a lever fixedly connected to the throttle valve and on the pipe end is supported on the pipe or on a bearing for accommodating a shaft extending coaxially with the pivot axis,
    wherein said restoring spring is adapted for supporting the spring forces on the pipe end essentially symmetrically with regard to a plane of symmetry running perpendicular to the pivot axis in the area of the support on the valve end and extending perpendicular to the pivot axis, and
    wherein the lever penetrates through the pipe in at least one side opening and is attached to the shaft in a rotationally fixed manner, whereby the shaft is mounted on the bearing to rotate about the pivot axis outside of the pipe.

2. The throttle arrangement according to claim 1, wherein said restoring spring is made of one piece.

3. The throttle arrangement according to claim 1, wherein said restoring spring is essentially symmetrical with respect to the plane of symmetry, at least in a spring section that produces the spring force.

4. The throttle arrangement according to claim 1, wherein the pivot axis extends outside of the pipe.

5. The throttle arrangement according to claim 1, wherein the shaft is secured in its bearing by the restoring spring.

6. The throttle arrangement according to claim 1, wherein the restoring spring is mounted on the bearing in a self-retaining manner and/or is attached or clipped or locked onto the bearing.

7. An exhaust system for an internal combustion engine comprising at least one exhaust line carrying exhaust gas away from the internal combustion engine, in which at least one throttle arrangement according to claim 1 is situated.

8. The throttle arrangement according to claim 1, wherein said restoring spring is supported on said throttle valve or on the lever via either a single central contact point or a line of contact extending parallel to the pivot axis or at least two contact points that are spaced a distance apart in the longitudinal direction of the pivot axis and are equidistant with respect to the pivot axis.

9. The throttle arrangement according to claim 8, wherein the line of contact or the contact points are arranged so they are symmetrical with respect to the plane of symmetry.

10. A throttle arrangement for an exhaust system of an internal combustion engine, said throttle arrangement comprising:
    a throttle valve for throttling a stream of exhaust gas flowing through a pipe; and a restoring spring which prestresses said throttle valve into a closed position;

wherein said throttle valve in the pipe can be pivoted about a pivot axis between the closed position, in which it at least partially closes a predetermined cross-sectional area of the pipe, and an open position, in which it releases the cross-sectional area due to the pressure of the exhaust gas against the spring force of said restoring spring, wherein said restoring spring is supported on said throttle valve on the valve end or on a lever fixedly connected to the throttle valve and on the pipe end is supported on the pipe or on a bearing for accommodating a shaft extending coaxially with the pivot axis, wherein said restoring spring is adapted for supporting the spring forces on the pipe end essentially symmetrically with regard to a plane of symmetry running perpendicular to the pivot axis in the area of the support on the valve end and extending perpendicular to the pivot axis, and wherein said restoring spring is a double-leg spring having two helical spring sections joined together by a strap that is supported on said throttle valve or on said lever.

11. The throttle arrangement according to claim 10, wherein said double-leg spring is held on the bearing arranged outside of the pipe.

12. The throttle arrangement according to claim 10, wherein said double-leg spring is supported on an abutment of the bearing with at least one of its free legs under a prestress.

13. The throttle arrangement according to claim 10, wherein said double-leg spring secures the shaft radially on the bearing with at least one of its free legs.

14. The throttle arrangement according to claim 10, wherein said helical spring sections are arranged outside of the shaft.

15. The throttle arrangement according to claim 10, wherein said helical spring sections are arranged so they are free-standing between the strap and the free legs.

16. An exhaust system for an internal combustion engine comprising at least one exhaust line carrying exhaust gas away from the internal combustion engine, in which at least one throttle arrangement according to claim 10 is situated.

17. A throttle arrangement for an exhaust system of an internal combustion engine, said throttle arrangement comprising:

a throttle valve for throttling a stream of exhaust gas flowing through a pipe; and a restoring spring which prestresses said throttle valve into a closed position;

wherein said throttle valve in the pipe can be pivoted about a pivot axis between the closed position, in which it at least partially closes a predetermined cross-sectional area of the pipe, and an open position, in which it releases the cross-sectional area due to the pressure of the exhaust gas against the spring force of said restoring spring, wherein said restoring spring is supported on said throttle valve on the valve end or on a lever fixedly connected to the throttle valve and on the pipe end is supported on the pipe or on a bearing for accommodating a shaft extending coaxially with the pivot axis, wherein said restoring spring is adapted for supporting the spring forces on the pipe end essentially symmetrically with regard to a plane of symmetry running perpendicular to the pivot axis in the area of the support on the valve end and extending perpendicular to the pivot axis, and wherein said restoring spring is a plate spring which is supported on the throttle valve or on the lever with an end section.

18. The throttle arrangement according to claim 17, wherein said plate spring has a holding section with which it is held on the bearing outside of the pipe.

19. The throttle arrangement according to claim 17, wherein said plate spring has at least one securing section on its holding section with which it secures the shaft radially on the bearing and/or centers it axially and/or secures it axially.

20. An exhaust system for an internal combustion engine comprising at least one exhaust line carrying exhaust gas away from the internal combustion engine, in which at least one throttle arrangement according to claim 17 is situated.

* * * * *